(12) United States Patent
Drotleff et al.

(10) Patent No.: US 11,993,241 B2
(45) Date of Patent: May 28, 2024

(54) OPERATIONAL METHOD FOR CONTROLLING THE BRAKE PRESSURE GENERATOR OF THE MAIN SYSTEM

(71) Applicant: Robert Bosch GmbH, Stuttgart (DE)

(72) Inventors: Dirk Drotleff, Oberstenfeld-Gronau (DE); Xun Yao, Beilstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 413 days.

(21) Appl. No.: 17/419,437

(22) PCT Filed: Feb. 11, 2020

(86) PCT No.: PCT/EP2020/053464
§ 371 (c)(1),
(2) Date: Jun. 29, 2021

(87) PCT Pub. No.: WO2020/169415
PCT Pub. Date: Aug. 27, 2020

(65) Prior Publication Data
US 2021/0387601 A1    Dec. 16, 2021

(30) Foreign Application Priority Data
Feb. 21, 2019 (DE) ......................... 102019202360.6

(51) Int. Cl.
*B60T 8/58* (2006.01)
*B60T 13/66* (2006.01)

(52) U.S. Cl.
CPC .............. *B60T 8/58* (2013.01); *B60T 13/662* (2013.01); *B60T 2201/03* (2013.01); *B60T 2240/00* (2013.01)

(58) Field of Classification Search
CPC .......................... B60T 13/662; B60T 2201/03
See application file for complete search history.

(56) References Cited

U.S. PATENT DOCUMENTS

2015/0051805 A1* 2/2015 Mayer ................... B60T 13/686
                                                              701/70
2016/0325719 A1* 11/2016 Linhoff ................ B60T 8/4872
(Continued)

FOREIGN PATENT DOCUMENTS

CN         102933439 A      2/2013
CN         105644539 A      6/2016
(Continued)

OTHER PUBLICATIONS

International Search Report for PCT/EP2020/053464, dated Jun. 9, 2020.

*Primary Examiner* — Jaime Figueroa
*Assistant Examiner* — Jerrod Irvin Davis
(74) *Attorney, Agent, or Firm* — NORTON ROSE FULBRIGHT US LLP; Gerard A. Messina

(57) ABSTRACT

An operational method for controlling a first brake pressure generator. The operational method includes reading the detected wheel speeds into the brake pressure generator control unit, simulating a control strategy of the secondary control unit for controlling the hydraulic unit based on the wheel speeds so that a brake pressure required at the respective wheel is ascertained, predicting the pressure resulting from the control strategy of the secondary control unit and the brake pressure at the first brake pressure generator, and controlling the first brake pressure generator in accordance with the predicted resulting pressure if the predicted resulting pressure exceeds a limit value, so that the pressure resulting at the brake pressure generator is lower than the predicted pressure due to an activation of the first brake pressure generator.

9 Claims, 2 Drawing Sheets

(56) References Cited

U.S. PATENT DOCUMENTS

| | | | |
|---|---|---|---|
| 2020/0039490 A1* | 2/2020 | Kobayashi | B60T 13/662 |
| 2021/0031739 A1* | 2/2021 | Schwindl | B60T 8/4081 |
| 2021/0146894 A1* | 5/2021 | Matsumura | B60T 8/171 |

FOREIGN PATENT DOCUMENTS

| | | |
|---|---|---|
| CN | 109070860 A | 12/2018 |
| DE | 102012202006 A1 | 8/2013 |
| DE | 102016210951 A1 | 12/2017 |
| DE | 102016226321 A1 | 7/2018 |

* cited by examiner

OPERATIONAL METHOD FOR CONTROLLING THE BRAKE PRESSURE GENERATOR OF THE MAIN SYSTEM

FIELD

The present invention relates to an operational method for controlling a brake pressure generator of the main system and a hydraulically closed brake system for carrying out this operational method.

BACKGROUND INFORMATION

German Patent Application No. DE 10 2016 210 951 A1 describes a control device for a brake system of a vehicle, which is designed to determine a wheel brake cylinder-specific or nonspecific setpoint brake pressure that is to be built up in at least one wheel brake cylinder of the brake system, to determine a wheel brake cylinder-specific or nonspecific comparison value for a setpoint brake pressure, and to control a motorized device of the brake system by taking into account the respectively determined comparison value.

High pressures often occur during an ABS maneuver in the combination of electromechanical brake booster and ABS/ESP or plunger system and ABS/ESP. Due to these high pressures, the master cylinder pressure or plunger chamber pressure exhibits a high amplitude of oscillation, which put a high mechanical load on both devices. These high loads are produced by the fact that the ABS/ESP increases the stiffness of the brake system by switching the valves and conveys volumes from the accumulator back against the plunger (e.g., during ABS). In addition, the control and the mass inertia of the electromechanical brake booster or the plunger system causes the master brake cylinder/plunger to be pushed further and thus build up additional pressure since these systems do not receive, or receive only belatedly, the information that the ABS/ESP has closed the valves and/or that volume is conveyed back from the accumulator. These items of information from ABS/ESP are transmitted via a bus system and thus reach the electromechanical brake booster or plunger system in time-delayed fashion, which in all results in a higher load.

It is thus an object of the present invention to indicate an operational method which allows for the load on the components to be reduced.

SUMMARY

The object may be achieved by an operational method for controlling a brake pressure generator of the main system having the features in accordance with an example embodiment of the present invention and a hydraulically closed brake system having the features in accordance with an example embodiment of the present invention. Advantageous refinements of the present invention are disclosed herein.

The present invention provides an operational method for controlling a brake pressure generator of the main system of a hydraulically closed brake system. In this context, the brake system additionally comprises at least a brake pressure generator control unit controlling the first brake pressure generator of the main system, and a secondary system, in which a second brake pressure generator, a hydraulic unit and a secondary control unit controlling the hydraulic unit and the second brake pressure generator for pressure modulation are operated.

In accordance with an example embodiment of the present invention, the operational method comprises the steps of reading the detected wheel speeds into the brake pressure generator control unit, of simulating a control strategy of the secondary control unit for controlling the hydraulic unit on the basis of the wheel speeds so that a brake pressure required at the respective wheel is ascertained, of predicting the pressure resulting from the control strategy of the secondary control unit and the brake pressure at the first brake pressure generator, and of controlling the first brake pressure generator in accordance with the predicted resulting pressure if the predicted resulting pressure exceeds a limit value, so that the pressure resulting at the brake pressure generator is lower than the predicted pressure as a result of an activation of the first brake pressure generator.

A hydraulically closed system in the sense of the present invention is a brake system in which brake fluid discharged during a particular brake pressure modulation is stored in the hydraulic unit and is able to be returned into the brake circuit via the brake pressure generator of the secondary system. The brake pressure modulation makes it possible to perform various control functions on the wheels. Such control functions comprise for example an anti-lock control (ABS), a traction-slip control (ASR) and an electronic stability control (ESP).

A brake pressure generator is understood as any conventional/available option, by which the brake pressure in a brake system may be increased by a suitable activation. This brake pressure generator is activated by a corresponding control unit. The control unit detects and processes the sensor signals and, on the basis of these sensor signals, outputs a corresponding pressure control to the brake pressure generator. In order to allow for a corresponding processing of the sensor signals, a software may be installed on the control unit.

A hydraulic unit is understood as a system of hydraulic lines and valves switching these hydraulic lines, via which it is possible to activate the wheel brakes. The control unit activates the valves so as to implement the pressure modulation. This makes it possible to brake specific wheel brakes by an activation of the corresponding valves. For this purpose, the brake fluid drained from the hydraulic unit is fed either to a fluid reservoir or to the brake pressure generator.

In accordance with an example embodiment of the present invention, a simulation of the control strategy of the secondary control unit is performed in the brake pressure generator control unit of the main system. This means that the same function for controlling the hydraulic unit is provided both in the brake pressure generator control unit as well as in the secondary control unit. For the purpose of this control, it is thus necessary to read the wheel speeds into both control units. In contrast to the secondary control unit, the control action is merely simulated in the brake pressure generator control unit.

On the basis of this simulated control, it is then possible to anticipate the subsequent control. The brake pressure generator control unit is thus independent of data of the secondary control unit. On this basis, it is likewise possible to predict the pressure occurring at the first brake pressure generator as a result of the control. This makes it possible to control the first brake pressure generator accordingly so that the resulting pressure occurring at the first brake pressure generator is smaller than the predicted pressure. This makes it possible to reduce hardware-damaging pressure spikes to a harmless level. Additionally, a more harmonic pressure control is possible for example in the case of ABS maneuvers.

It is possible to use any pressure as a limit value for this control. It is advantageous, however, to use a pressure starting with which the respective hardware would be damaged. This allows for the individual components to be designed to be smaller, saving material and weight. Such a hydraulically closed brake system is thus more economical to produce.

The simulation is advantageously performed by a computer program product having program code, which runs on the brake pressure generator control unit or is stored on a computer-readable data carrier.

In a preferred example embodiment of the present invention, the brake pressure generator control unit when exceeding a probability of a predicted necessary intervention of the secondary control unit, a movement of the first brake pressure generator into a brake pressure increase direction is slowed down. A movement into a brake pressure increase direction is understood for example in a plunger system as the speed of the forward movement of the piston against the brake fluid so that the pressure in the brake system is increased.

Thus, on the basis of the wheel speeds, starting from a specific probability for a necessary intervention of the secondary control unit, a respective control of the first brake pressure generator is anticipated prior to the intervention of this control unit. In this control, the movement into the brake pressure increase direction is slowed down. This makes it possible to implement a quick and effective pressure reduction in the subsequent intervention.

In another preferred example embodiment of the present invention, the brake pressure generator control unit in the event of a predicted necessary intervention of the secondary control unit, in the event of an activation of the hydraulic unit, the first brake pressure generator is controlled into a brake pressure reduction direction, so that the pressure resulting at the first brake pressure generator is reduced. Corresponding to the brake pressure increase direction, the brake pressure reduction direction is a direction, in which for example in a plunger system the piston moves away from the brake fluid so that the pressure in the brake system is reduced. The pressure spikes occurring through the activation of the hydraulic unit are at least reduced or in the ideal case completely compensated by the additionally created volume.

Preferably, following a completed intervention of the secondary control unit, the first brake pressure generator is moved again into a brake pressure increase direction so that brake pressure is built up. After the pressure increase occurring due to the control is completed, a sufficient pressure may thus be provided for a following pressure-increasing brake intervention, so that the corresponding control of the first brake pressure generator does not reduce the operability of the brake system.

The object of the present invention may additionally be achieved by a hydraulically closed brake system for carrying out the operational method of the present invention. In accordance with an example embodiment of the present invention, the brake system comprises in this context at least a main system, a secondary system, which is hydraulically connected to the main system, a first brake pressure generator for generating brake pressure, the first brake pressure generator being situated in the main system, and a second brake pressure generator for generating brake pressure, the second brake pressure generator being situated in the secondary system.

The brake system additionally comprises a hydraulic unit, which is situated in the secondary system and by which the brake pressure at the respective wheel is switchable via valves, a secondary control unit, by which the hydraulic unit is controllable on the basis of wheel speeds, so that it is possible to implement a pressure modulation, and a brake pressure generator control unit, which is situated in the main system, the control strategy of the secondary control unit being able to be simulated in the brake pressure generator control unit on the basis of the wheel speeds and via which the first brake pressure generator is able to be activated. The advantages mentioned with respect to the operational method may be achieved using such a brake system.

In one advantageous development of the present invention, the first brake pressure generator is implemented as a plunger system. Alternatively, the first brake pressure generator is implemented as an electromechanical brake booster (e.g., iBooster). Using such brake pressure generators, it is possible to carry out the method of the present invention advantageously, so that the advantages mentioned with respect to the operational method are achievable.

Furthermore, the present invention also provided a vehicle having such a brake system. The vehicle is in this context particularly preferably a highly automated or autonomous vehicle. The advantages mentioned with respect to the brake system may be achieved using such a vehicle.

Exemplary embodiments of the present invention are depicted in the figures and explained in greater detail in the description below.

DETAILED DESCRIPTION OF EXAMPLE EMBODIMENTS

Figure 1:
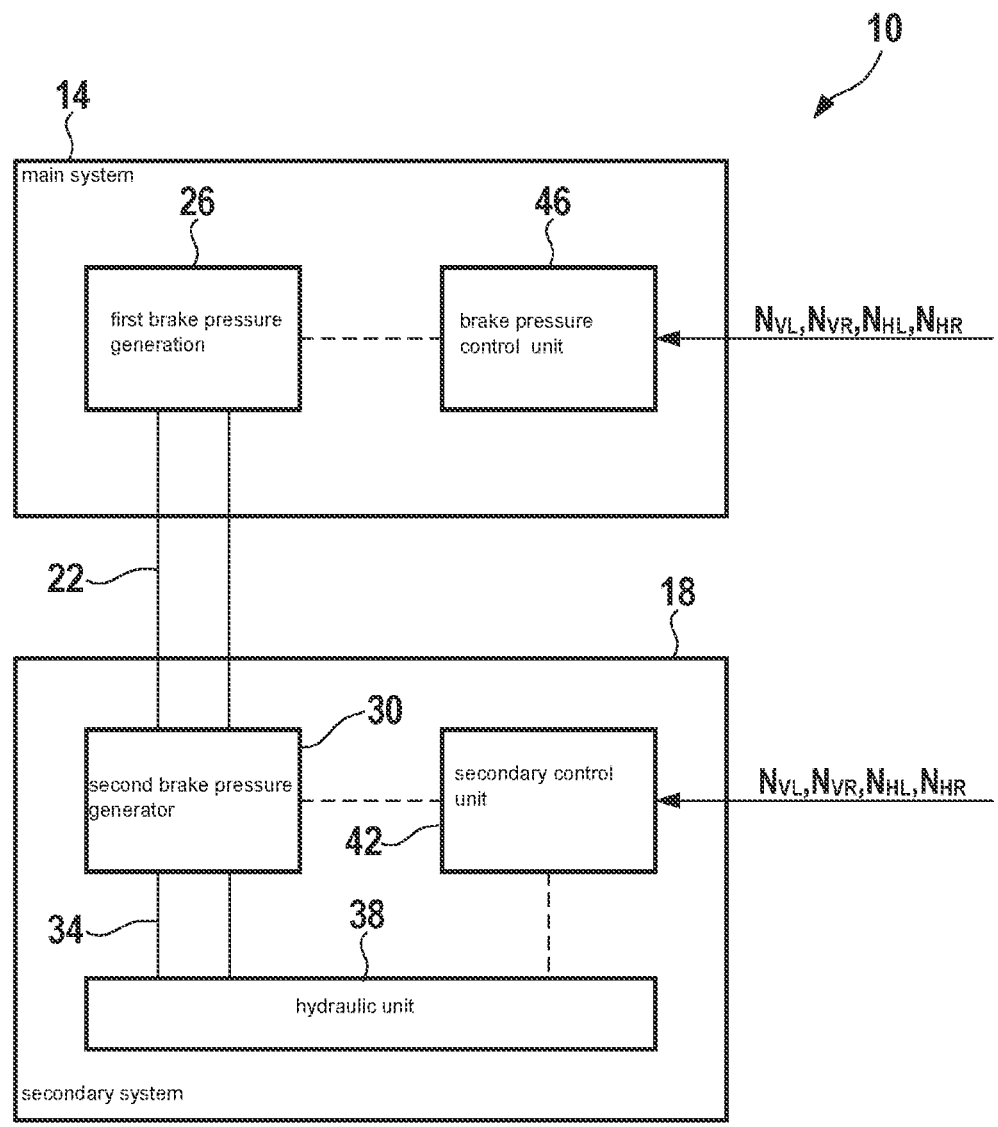
FIG. 1 shows an exemplary embodiment of a hydraulically closed brake system for a vehicle for carrying out the operational method of the present invention.

FIG. 1 shows an exemplary embodiment of a hydraulically closed brake system 10 for a vehicle for carrying out the operational method of the present invention. The hydraulically closed brake system 10 is illustrated in considerably simplified fashion in this figure. Brake system 10 in this instance comprises a main system 14 and a secondary system 18, which are hydraulically connected to one another via fluid lines 22. A first brake pressure generator 26 is shown in main system 14, which is able to generate a brake pressure. The brake pressure generated in first brake pressure generator 26 is transmitted to secondary system 18 via fluid lines 22.

Fluid lines 22 are connected in secondary system 18 to a second brake pressure generator 30. In addition to first brake pressure generator 26, second brake pressure generator 30 also builds up brake pressure. Second brake pressure generator 30 is connected to a hydraulic unit 38 via hydraulic unit lines 34. Hydraulic unit 38, which is likewise situated in secondary system 18, is formed by a plurality of hydraulic lines and valves (not shown) switching these hydraulic lines, via which it is possible to activate the respective wheel brakes.

Additionally, a secondary control unit 42 is situated in secondary system 18. Secondary control unit 42 acquires wheel speeds $N_{VL}$, $N_{VR}$, $N_{HL}$, $N_{HR}$, which are measured for example via wheel speed sensors. On the basis of these wheel speeds $N_{VL}$, $N_{VR}$, $N_{HL}$, $N_{HR}$, a required brake pressure at the respective wheel is calculated and the valves of hydraulic unit 38 and second brake pressure generator are controlled accordingly. A pressure modulation at the respective wheels is possible in order to implement various functions.

Additionally, a brake pressure generator control unit 46 is situated in main system 14. This brake pressure generator control unity 46 controls the generated pressure of first brake pressure generator 26. Like secondary control unit 42, brake pressure generator control unit 46 also acquires the wheel speeds $N_{VL}$, $N_{VR}$, $N_{HL}$, $N_{HR}$ of the wheels. The brake pressure generator control unit 46 thus has the same measurement values as secondary control unit 42.

On the basis of these wheel speeds $N_{VL}$, $N_{VR}$, $N_{HL}$, $N_{HR}$, brake pressure generator control unit 46 simulates the control strategy of secondary control unit 42. As a result, brake pressure generator control unit 46 is familiar with the control of second brake pressure generator 30 and of hydraulic unit 38 performed by secondary control unit 42. Accordingly, the anticipated pressure $p_v$ resulting from the control at first brake pressure generator 26 is estimated on the basis of this simulation.

On the basis of the predicted pressure $p_v$, first brake pressure generator 26 is accordingly controlled by brake pressure generator control unit 46 so that the resulting pressure at the first brake pressure generator 26 is smaller than the predicted pressure $p_v$. This may occur, for example, by a movement of first brake pressure generator 26 in a brake pressure reduction direction.

Figure 2:
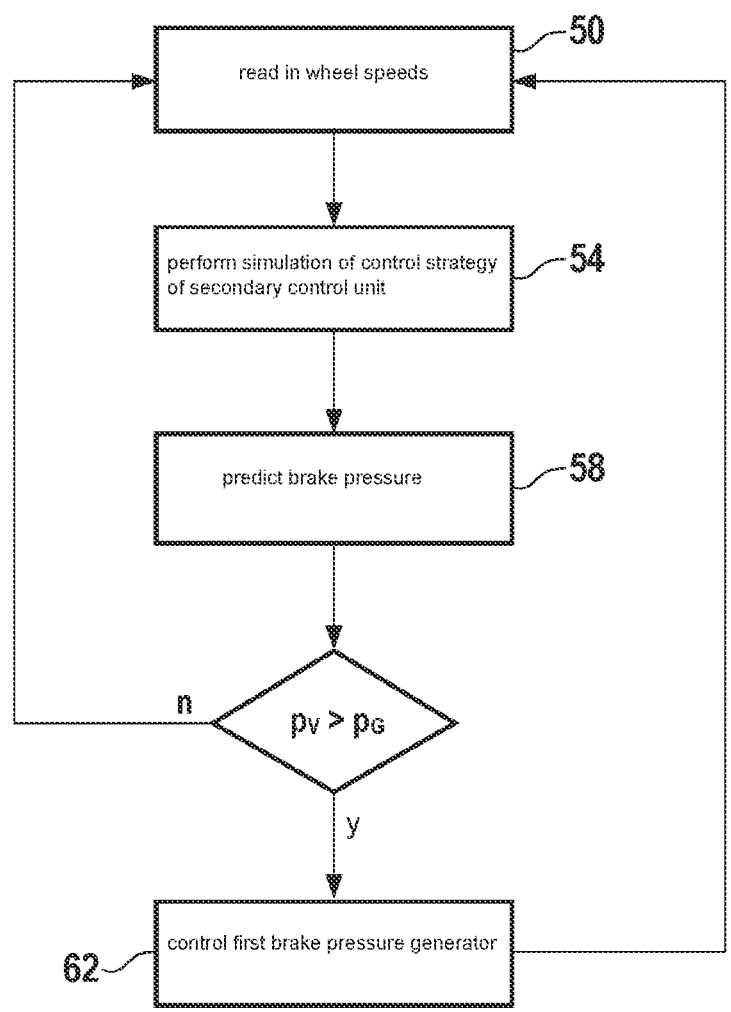
FIG. 2 shows an exemplary embodiment of the operational method for controlling a first brake pressure generator.

FIG. 2 shows an exemplary embodiment of the operational method for controlling first brake pressure generator 26. In a first step 50, wheel speeds $N_{VV}$, $N_{VR}$, $N_{HL}$, $N_{HR}$ of the wheels of the vehicle are read in. In a subsequent second step 54, a simulation of the control strategy of secondary control unit 42 is performed so that a brake pressure required at the respective wheel is ascertained.

On the basis of this control strategy and the required brake pressure, the pressure $p_v$ resulting from the control strategy and the brake pressure at first brake pressure generator 26 is predicted in a third step 58. If this predicted pressure $p_v$ is smaller than a limit value $p_G$, the method begins again with the first step 50. If the predicted pressure $p_v$ is greater than the limit value $p_G$, brake pressure generator control unit 46 controls the first brake pressure generator 26 in a fourth step 62 in accordance with the predicted pressure $p_v$.

First brake pressure generator 26 is controlled so that the subsequently resulting pressure at first brake pressure generator 26 is smaller than the predicted pressure $p_v$. For example, prior to an activation of hydraulic unit 38, first brake pressure generator 26 is controlled to move in a brake pressure reduction direction. This increases the volume in first brake pressure generator 26 so that the resulting pressure is reduced.

In addition, it is possible for the control to occur already prior to the actual wheel pressure-reducing intervention of secondary control unit 42 in that a probability for a possible intervention of this control unit 42 is ascertained, as this also occurs in secondary control unit 42, in order to reduce already the wheel pressure buildup speed. If there exists a high probability for a necessary intervention of secondary control unit 42, it is possible to slow down the movement of first brake pressure generator 26 in a brake pressure increase direction already prior to the actual intervention. This reduces a necessary movement in a brake pressure reduction direction so that it is possible to reduce the pressure resulting at first brake pressure generator 26 quickly and effectively.

In order generate again a sufficient brake pressure following a concluded intervention of secondary control unit 42, the first brake pressure generator may be moved again in a brake pressure increase direction.

What is claimed is:

1. An operational method for controlling a first brake pressure generator, which is operated in a main system of a hydraulically closed brake system for a vehicle, the brake system including at least the first brake pressure generator and a brake pressure generator control unit configured to control the first brake pressure generator, and a secondary system, including a second brake pressure generator, a hydraulic unit, and a secondary control unit configured to activate the hydraulic unit and the second brake pressure generator for pressure modulation, the operational method comprising the following steps:

reading detected wheel speeds into the brake pressure generator control unit;

simulating a control strategy of the secondary control unit for controlling the hydraulic unit based on the wheel speeds so that a brake pressure required at a respective wheel is ascertained;

predicting a pressure resulting from the control strategy of the secondary control unit and the brake pressure at the first brake pressure generator; and controlling the first brake pressure generator in accordance with the predicted resulting pressure when the predicted resulting pressure exceeds a limit value, so that the pressure resulting at the brake pressure generator is smaller than the predicted pressure, as a result of an activation of the first brake pressure generator.

2. The operational method as recited in claim 1, wherein the brake pressure generator control unit, when exceeding a probability of a predicted necessary intervention of the secondary control unit, slows down a movement of the first brake pressure generator into a brake pressure increase direction.

3. The operational method as recited in claim 1, wherein the brake pressure generator control unit, in the event of a predicted necessary intervention of the secondary control unit, in the event of an activation of the hydraulic unit, controls the first brake pressure generator in a brake pressure reduction direction, so that the pressure resulting at the first brake pressure generator is reduced.

4. The operational method as recited in claim 1, wherein, following a completed intervention of the secondary control unit, the first brake pressure generator is moved again in a brake pressure increase direction, so that brake pressure is built up.

5. A hydraulically closed brake system for a vehicle, the brake system comprising:

a main system;

a secondary system, which is hydraulically connected to the main system;

a first brake pressure generator configured to generate brake pressure, the first brake pressure generator being situated in the main system;

a second brake pressure generator configured to generate brake pressure, the second brake pressure generator being situated in the secondary system;

a hydraulic unit situated in the secondary system and by which the brake pressure at a respective wheel is switchable via valves;

a secondary control unit, by which the hydraulic unit is controllable based on wheel speeds, so that a pressure modulation is realizable; and a brake pressure generator control unit, situated in the main system and configured to:

simulate a control strategy of the secondary control unit based on the wheel speeds, and via which the first brake pressure generator is able to be activated, predict a pressure resulting from the control strategy of the secondary control unit and the brake pressure at the first brake pressure generator; and control the first brake pressure generator in accordance with the predicted resulting pressure when the predicted resulting pressure exceeds a limit value, so that the pressure resulting at the brake pressure generator is smaller than the predicted pressure, as a result of an activation of the first brake pressure generator.

6. The hydraulically closed brake system as recited in claim 5, wherein the first brake pressure generator is implemented as a plunger system.

7. The hydraulically closed brake system as recited in claim 5, wherein the first brake pressure generator is implemented as an electromechanical brake booster.

8. A vehicle, comprising:
a hydraulically closed brake system including:
a main system,
a secondary system, which is hydraulically connected to the main system,
a first brake pressure generator configured to generate brake pressure, the first brake pressure generator being situated in the main system,
a second brake pressure generator configured to generate brake pressure, the second brake pressure generator being situated in the secondary system,
a hydraulic unit situated in the secondary system and by which the brake pressure at a respective wheel is switchable via valves,
a secondary control unit, by which the hydraulic unit is controllable based on wheel speeds, so that a pressure modulation is realizable, and
a brake pressure generator control unit, situated in the main system and configured to:

simulate a control strategy of the secondary control unit based on the wheel speeds, and via which the first brake pressure generator is able to be activated, predict a pressure resulting from the control strategy of the secondary control unit and the brake pressure at the first brake pressure generator; and control the first brake pressure generator in accordance with the predicted resulting pressure when the predicted resulting pressure exceeds a limit value, so that the pressure resulting at the brake pressure generator is smaller than the predicted pressure, as a result of an activation of the first brake pressure generator.

9. A non-transitory computer-readable data carrier on which is stored a computer program including program code for use in controlling a first brake pressure generator, which is operated in a main system of a hydraulically closed brake system for a vehicle, the brake system including at least the first brake pressure generator and a brake pressure generator control unit configured to control the first brake pressure generator, and a secondary system, including a second brake pressure generator, a hydraulic unit, and a secondary control unit configured to activate the hydraulic unit and the second brake pressure generator for pressure modulation, the program code, when executed by the brake pressure generator control unit, causing the brake pressure generator control unit to perform:

simulating a control strategy of the secondary control unit for controlling the hydraulic unit based on detected wheel speeds of the vehicle so that a brake pressure required at a respective wheel is ascertained, wherein the program code further causes the brake pressure control unit to perform:

predicting a pressure resulting from the control strategy of the secondary control unit and the brake pressure at the first brake pressure generator; and controlling the first brake pressure generator in accordance with the predicted resulting pressure when the predicted resulting pressure exceeds a limit value, so that the pressure resulting at the brake pressure generator is smaller than the predicted pressure, as a result of an activation of the first brake pressure generator.

* * * * *